United States Patent Office 3,651,040
Patented Mar. 21, 1972

3,651,040
WATER-INSOLUBLE PHENYL-AZO-PHENYL MONOAZO DYESTUFFS
Winfried Kruckenberg, Leverkusen, Germany, assignor to Farbenfabriken Bayer Aktiengesellschaft, Leverkusen, Germany
No Drawing. Filed Feb. 12, 1969, Ser. No. 798,767
Claims priority, application Germany, Feb. 23, 1968, P 17 19 076.0
Int. Cl. C07c 107/06; C09b 29/08
U.S. Cl. 260—207.1  6 Claims

ABSTRACT OF THE DISCLOSURE

Water-insoluble orange to red monoazo dyestuffs of the formula

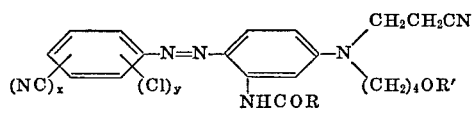

in which
R is $CH_3$ or $C_2H_5$;
R' is H or —COR";
R" is $CH_3$, $C_2H_5$, $OCH_3$ or $OC_2H_5$;
$x$ is 1 or 2; and
$y$ is 0, 1, 2 or 3;

are disclosed for dyeing hydrophobic fiber materials, e.g. polyester. The dyeings are characterized by good fastness to alkaline boiling and good fastness to sublimation.

---

The object of the present invention comprises water-insoluble monoazo dyestuffs of the general formula

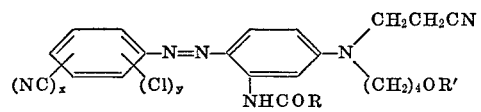

in which R stands for $CH_3$ or $C_2H_5$; R' means H or the radical —COR" where R" denotes $CH_3$, $C_2H_5$, $OCH_3$ or $OC_2H_5$; $x$ stands for the numbers 1 or 2; and $y$ denotes the numbers 0–3, as well as their production and use.

The orange to scarlet dyestuffs are obtained in the usual manner by coupling a diazotised amine of the formula

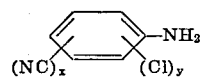

in which $x$ and $y$ have the same meaning as above, with coupling components of the formula

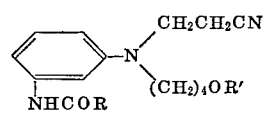

in which R and R' have the same meaning as above.

Coupling is preferably carried out in an acidic medium.
Suitable diazo components are, for example, 2-cyano-4,5,6-trichloroaniline, 2-cyano-5-chloroaniline, 2,4-di-dicyanoaniline, 3,4-dicyanoaniline, 2,5-dichloro-4-cyano-aniline, 2,4-dicyano-6-chloroaniline, 2,5-dicyanoaniline, 3,4-dichloro-2,6-dicyanoaniline, 3,4-dicyanoaniline.
Suitable coupling components are, for example,

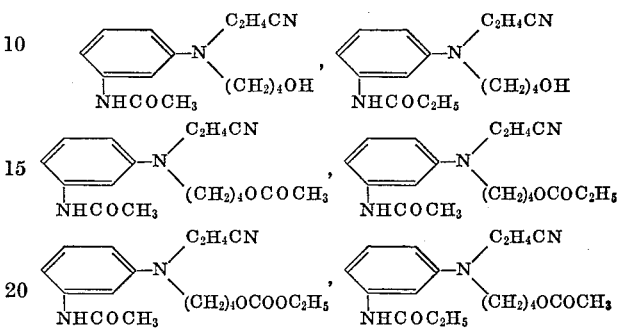

The orange to red dyestuffs thus obtained are eminently suitable for the dyeing of hydrophobic fibre materials, especially those consisting of aromatic polyesters such as polyethylene terephthalate. They are characterised by a particularly good fastness to boiling in the alkaline range and are therefore especially suitable for dyeing polyester/cotton mixed fabrics in combination with reactive dyestuffs from an alkaline bath. For the same reason and also because of their particularly good fastness to sublimation, they are especially well suited for dyeing these mixed fabrics in combination with reactive dyestuffs by the thermosol process.

EXAMPLE 1

14.9 g. 2,5-dicyano-aniline are dissolved in 200 g. of concentrated sulphuric acid and diazotised by the addition of 17 ml. nitrosyl-sulphuric acid (100 ml. correspond to 42 g. nitrite) at 0–5° C. while stirring. The diazonium salt solution is poured with stirring into a solution of 30.9 g. of the compound of the formula

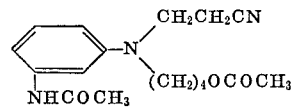

in dilute sulphuric acid and ice. The mixture is then buffered to pH 5.5–6, first with a sodium hydroxide solution and then very slowly with sodium acetate, the product is filtered off with suction, washed and dried. The dyestuff so obtained is a reddish powder which dissolves in organic solvents with an orange colour. When dispersed by suitable means, the dyestuffs dyes polyethylene terephthalate fibres in clear orange shades of good fastness to sublimation, washing, light and boiling.

The following dyestuffs which dye fabrics of polyethylene terephthalate in the specified shades are obtained from the corresponding diazo and coupling components:

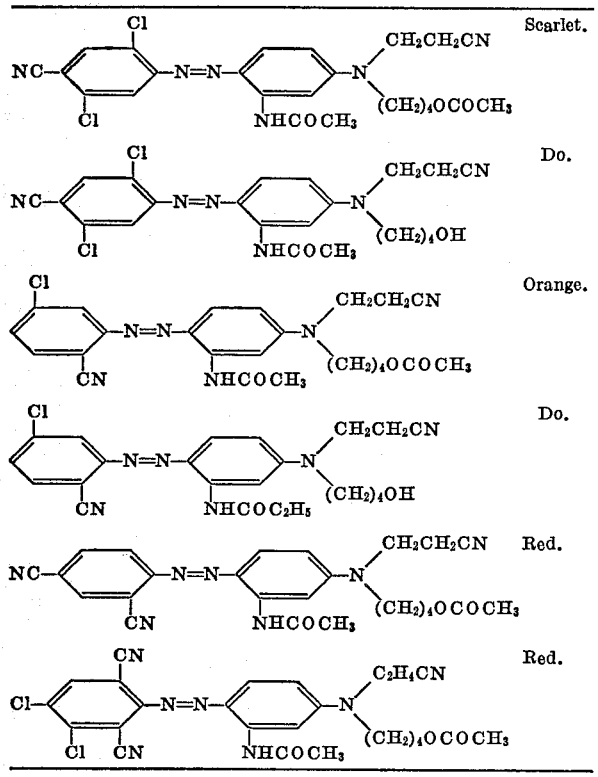

EXAMPLE 2

A mixed fabric of polyethylene glycol terephthalate/cotton 67/33 is impregnated on a foulard in the usual manner with al iquor containing, per litre, 50 g. of a 30% dyestuff of the formula

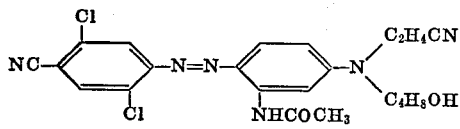

and 30 g. of an 80% dyestuff of the formula

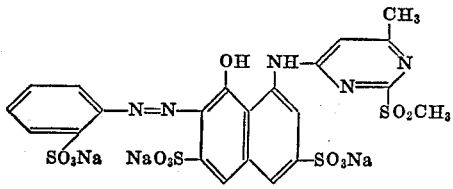

60 g. urea and 10 g. sodium bicarbonate. The fabric is squeezed to a weight increase of about 70% first dried in a drying, condensation and fixation apparatus at about 100° C. and subsequently treated with hot air at 210° C. for about 60 seconds, then washed with water, soaped at 80° C., again washed with water, and dried. A scarlet bicolour dyeing is thus obtained of excellent levelness and very good fastness properties.

What is claimed is:
1. Dyestuff having the formula

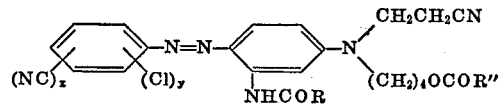

in which
R is $CH_3$ or $C_2H_5$;
R'' is $CH_3$, $C_2H_5$,
x is 1 or 2; and
y is 0, 1, 2 or 3.

2. The dyestuff of claim 1 having the formula

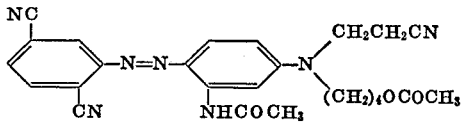

3. The dyestuff of claim 1 having the formula

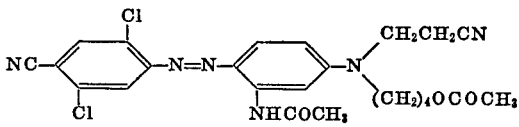

4. The dyestuff of claim 1 having the formula

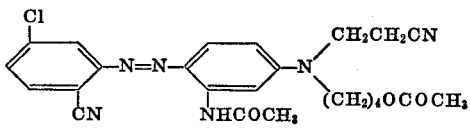

5. The dyestuff of claim 1 having the formula

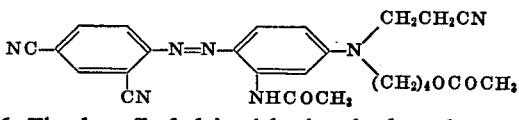

6. The dyesuff of claim 1 having the formula

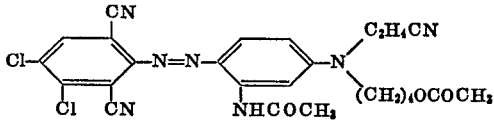

References Cited

UNITED STATES PATENTS

| | | | |
|---|---|---|---|
| 2,971,953 | 2/1961 | Rhyner | 260—207.1 |
| 3,268,507 | 8/1966 | Kruckenberg | 260—207 |

FOREIGN PATENTS

| | | | |
|---|---|---|---|
| 1,425,585 | 12/1965 | France | 260—207 |

JOSEPH REBOLD, Primary Examiner
C. F. WARREN, Assistant Examiner

U.S. Cl. X.R.
8—26; 260—154